United States Patent
Kim (10) Patent No.: US 11,555,117 B2
(45) Date of Patent: Jan. 17, 2023

(54) POLYAMIDE FORMULATIONS COMPRISING SEMI-CRYSTALLINE COPOLYAMIDE AND FLAT GLASS FIBERS

(71) Applicant: BASF SE, Ludwigshafen am Rhein (DE)

(72) Inventor: Tae-Kyun Kim, Gyeonggi-do (KR)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/955,863

(22) PCT Filed: Dec. 20, 2018

(86) PCT No.: PCT/EP2018/086224
§ 371 (c)(1),
(2) Date: Jun. 19, 2020

(87) PCT Pub. No.: WO2019/122142
PCT Pub. Date: Jun. 27, 2019

(65) Prior Publication Data
US 2020/0332120 A1    Oct. 22, 2020

(30) Foreign Application Priority Data
Dec. 21, 2017   (EP) .................................... 17306880

(51) Int. Cl.
| | |
|---|---|
| *C08L 77/06* | (2006.01) |
| *B29C 45/00* | (2006.01) |
| *C08G 69/14* | (2006.01) |
| *C08G 69/26* | (2006.01) |
| *C08K 7/14* | (2006.01) |
| *B29K 77/00* | (2006.01) |

(52) U.S. Cl.
CPC .......... *C08L 77/06* (2013.01); *B29C 45/0001* (2013.01); *C08G 69/14* (2013.01); *C08G 69/265* (2013.01); *C08K 7/14* (2013.01); *B29K 2077/00* (2013.01); *C08K 2201/016* (2013.01); *C08L 2201/08* (2013.01); *C08L 2203/20* (2013.01); *C08L 2205/02* (2013.01)

(58) Field of Classification Search
CPC ........................... C08K 7/14; C08K 2201/016
See application file for complete search history.

(56) References Cited

U.S. PATENT DOCUMENTS

| | | | |
|---|---|---|---|
| 2007/0117910 A1 | 1/2007 | Drewlow | |
| 2009/0062452 A1 | 3/2009 | Harder et al. | |
| 2010/0029819 A1* | 2/2010 | Palmer | C08K 5/13 524/387 |
| 2012/0083558 A1 | 4/2012 | Bayer et al. | |
| 2013/0338260 A1 | 12/2013 | Center et al. | |
| 2014/0275367 A1 | 9/2014 | Kang et al. | |

FOREIGN PATENT DOCUMENTS

| | | |
|---|---|---|
| CN | 104364315 A | 2/2015 |
| EP | 3034558 A1 | 6/2016 |
| WO | 2015193144 A1 | 12/2015 |

OTHER PUBLICATIONS

International Search Report and Written Opinion for corresponding PCT/EP2018/086224 dated Mar. 28, 2019, 10 pages.

\* cited by examiner

*Primary Examiner* — Ana L. Woodward
(74) *Attorney, Agent, or Firm* — Armstrong Teasdale LLP (57) ABSTRACT

The present disclosure relates to a polyamide molding composition including a semi-aromatic, semi-crystalline copolyamide and flat glass fibers that shows a low tendency to absorb moisture and thus maintains its excellent mechanical and optical properties also during storage and/or use.

13 Claims, 4 Drawing Sheets

POLYAMIDE FORMULATIONS COMPRISING SEMI-CRYSTALLINE COPOLYAMIDE AND FLAT GLASS FIBERS

CROSS-REFERENCE TO RELATED APPLICATIONS

This application is a U.S. National Phase Application of PCT/EP2018/086224, filed on Dec. 20, 2018, which claims the benefit of priority to European Patent Application Number 17306880.0, filed Dec. 21, 2017, the entire contents of which are hereby incorporated by reference herein.

FIELD OF INVENTION

The present invention relates to polyamide compositions comprising a semi-aromatic, semi-crystalline copolyamide and flat glass fibers as reinforcing fillers.

BACKGROUND OF THE INVENTION

Polyamide compositions are frequently used for technical construction materials since they exhibit good toughness, rigidity and heat resistance, i.e., high performance retention of mechanical properties such as tensile strength (TS) to break and Charpy impact strength after thermal aging, high heat distortion temperature (HDT) and minimum distortion during injection molding. Areas of application of these compositions include, for example, interior and exterior parts in the automotive sector and in the area of other transport means, housing materials for appliances and equipment for telecommunications, entertainment electronics, household appliances, mechanical engineering equipment, equipment in the heating field and fasting parts for installations.

In order to exhibit the excellent mechanical properties, i.e. high rigidity and excellent toughness in addition to good heat resistance, the polyamide compositions comprise in addition to the polyamide resins reinforcing fillers, such as glass fibers (GF).

The glass fibers used in the polyamide compositions may have a circular cross section, also called standard (normal, round) glass fibers, as described for example in US2007/0117910 or US 2014/0275367, or a non-circular cross section, indicated as flat glass fibers.

The flat glass fibers can be used to reinforce a polyamide composition in place of standard glass fibers having a circular cross section, since flat glass fibers having a cross section whose major axis and minor axis have different values enable higher packing density at high degrees of reinforcement, resulting in higher flexural modulus, higher mechanical strength, especially along the direction of the fiber, and thus improve mechanical strengths and dimensional stability of the articles produced using the polyamide composition due to said geometrical advantages than the standard glass fibers.

The glass fibers have to be incorporated into the polyamide composition in a sufficient amount in order to meet the mechanical requirements as mentioned above.

WO 2015/193144, describes a polyamide composition which comprises a mixture of a semi-aromatic, semi-crystalline copolyamide and an aliphatic polyamide in combination with flat glass fibers. According to the teaching of WO 2015/193144 an amount of 12 to less than 20 wt.-% of flat glass fibers present in the composition is sufficient to provide a polyamide composition which fulfills the mechanical properties as required in the field of technical construction materials.

However, one insidious disadvantages of the polyamides compositions is that the polyamide compositions have the tendency to absorb moisture from ambient, which results in the change of their properties over time. The moisture may exist during different stages of the polymer processing; it may be absorbed from the surrounding atmosphere during storage and use. The moisture is known to affect a range of polyamide properties, in particular mechanical properties such as elastic modulus and strength, but also optical properties as for example gloss of the material and dimensional stability.

Hence, the present invention aims to provide a polyamide composition which shows excellent mechanical and optical properties, e.g. high rigidity, dimensional stability and excellent surface aspect, and which maintains these properties during storage and/or use.

SUMMARY OF THE INVENTION

Therefore, the present invention relates to a composition consisting of
a) 5 to 75 wt.-% of a semi-aromatic, semi-crystalline copolyamide 66/6A, with A being an monomeric unit derived from an aromatic dicarboxylic acid, having a molar ratio of polyamide 66 to polyamide 6A being in the range of 80:20 to 52:48;
b) 0 to 70 wt.-% of polyamide 66;
c) 25 to 80 wt.-% of flat glass fibers; and
d) at least one additive in an amount of 0 to 70 wt.-%;
wherein the total weight of a) to d) is 100 wt.-% of the composition.

It has been surprisingly be found that in case the composition contains at least 5 wt.-% of a semi-aromatic, semi-crystalline copolyamide 66/6A as defined above in combination with flat glass fibers in an amount of from 25 wt.-% to 80 wt.-%, based on the total weight of the composition, the tendency of this polyamide composition to absorb moisture is low and thus the mechanical and optical properties of the polyamide composition can be maintained during storage and/or use.

Furthermore, the composition of the present invention shows improved mechanical properties, flowability, surface quality and gloss values in comparison to copolyamide compositions known in the art.

DETAILED DESCRIPTION OF THE INVENTION

In the present document, the following definitions apply:

In general polyamides are to be understood as meaning polymers which are derived from dicarboxylic acids, diamines, aminocarboxylic acids and/or lactams. They may be homo- or copolymers.

The meaning of term "semi-crystalline polyamide" is known to a person skilled in the art. Usually, the term is intended to denote a polyamide comprising a crystallizable and an amorphous portion in the skeleton, i.e., an amorphous polymeric material which contains randomly entangled chains and a crystalline material which contains domains in which the polymer chains are packed in an ordered array, where these crystalline domains are embedded in an amorphous polymer matrix portion. In particular, the semi-crystalline polyamide in the solid state contains a fraction of regularly organized, crystalline polymeric domains in which polymer chains are packed in an ordered array (e.g. lamellae, spherulites). Crystalline domains coexist with a fraction of amorphous, non crystallized polymer domains. The semi-crystalline fraction shows a melting and a crystallization point range, and a melting and a crystallization enthalpy as well. Such values can be easily detected by experts in the field, e.g. by DSC analysis. The amorphous phase does not show any melting or crystallization point or enthalpy.

As used herein, the singular forms "a", "an", and "the" include both singular and plural referents unless the context clearly dictates otherwise. By way of example, "an additive" means one additive or more than one additive.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

As used herein, the terms "% by weight", "wt.-%", "weight percentage", or "percentage by weight" are used interchangeably.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

In the following passages, different alternatives, embodiments and variants of the invention are defined in more detail. Each alternative and embodiment so defined may be combined with any other alternative and embodiment, and this for each variant unless clearly indicated to the contrary or clearly incompatible when the value range of a same parameter is disjoined. In particular, any feature indicated as being preferred or advantageous may be combined with any other feature or features indicated as being preferred or advantageous.

Furthermore, the particular features, structures or characteristics described in present description may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art.

According to the present invention, the composition comprises 5 wt.-% to 75 wt.-%, based on the total weight of composition, of a semi-aromatic, semi-crystalline copolyamide 66/6A with A being a monomeric unit derived from an aromatic dicarboxylic acid (indicated also as PA66/6A).

Preferably, the composition comprises 5 to 70 wt.-%, more preferably 10 to 65 wt.-%, 15 to 60 wt.-%, 20 to 55 wt.-%, 25 to 50 wt.-%, more preferably 30 to 45 wt.-%, based on the total weight of composition, of the semi-aromatic, semi-crystalline copolyamide 66/6A with A being a monomeric unit derived from an aromatic dicarboxylic acid.

The copolyamide 66/6A can be obtained e.g. through melt polycondensation reaction of at least one aromatic dicarboxylic acid with adipic acid and hexamethylenediamine in stoichiometric composition. Alternatively, a salt of adipic acid and hexamethylenediamine and a salt of aromatic dicarboxylic acid and hexamethylenediamine can be prepared as a first step then fed into a polycondensation equipment to obtain the polyamide 66/6A, according one of technologies well known by men of art (e.g. as described in Nylon Plastics Handbook, edited by Melvin Kohan, Hanser Verlag, 1995).

The aromatic dicarboxylic acid is preferably selected from the group consisting of isophthalic acid (IA), terephthalic acid (TA), 2,5-pyridinedicarboxylic acid, 2,4-pyridinedicarboxylic acid, 3,5-pyridinedicarboxylic acid, 2,2-bis(4-carboxyphenyl)propane, bis(4-carboxyphenyl)-methane, 2,2-bis(4-carboxyphenyl)hexafluoropropane, 2,2-bis(4-carboxy-phenyl)-ketone, 4,4'-bis(4-carboxyphenyl)sulfone, 2,2-bis(3-carboxy-phenyl)-propane, bis(3-carboxyphenyl)methane, 2,2-bis(3-carboxyphenyl)-hexafluoropropane, 2,2-bis(3-carboxyphenyl)ketone, bis(3-carboxyphenoxy)benzene, 2,6-naphthalene dicarboxylic acid, 2,7-naphthalene dicarboxylic acid, 1,4-naphthalene dicarboxylic acid, 2,3-naphthalene dicarboxylic acid and 1,8-naphthalene dicarboxylic acid.

In particular, it is preferred that the aromatic dicarboxylic acid is terephthalic acid (TA) or isophthalic acid (IA) and thus the composition according to the present invention preferably comprises a semi-aromatic, semi-crystalline copolyamide 66/6T (PA66/6T) or copolyamide 66/6I (PA66/6I).

Furthermore, according to the present invention, the molar ratio of polyamide 66 to polyamide 6A in the copolyamide 66/6A is in the range of from 80:20 to 52:48, preferably in the range of from 70:30 to 55:45, most preferably the molar ratio is 65:35. Hence, the copolyamide 66/6A according to the present invention contains higher amounts of polyamide 66 than of polyamide 6A.

The melting point of the semi-aromatic, semi-crystalline copolyamide 66/6A may be measured by any known method, in particular by ASTM D 3418, i.e. by differential scanning calorimetry (DSC). The semi-aromatic, semi-crystalline copolyamide 66/6A has preferably a melting point of 300° C. or lower, more preferably the melting point is in a range of from 200 to 300° C., more preferably in a range of from 250 to 290° C., more preferably in a range of from 270° C. to 285° C.

Furthermore, the semi-aromatic, semi-crystalline copolyamide 66/6A preferably has a melting viscosity number measured according to ISO 307 of 60 to 140 ml/g, 70 to 130 ml/g, 75 to 120 ml/g, more preferably of 80 to 115 ml/g. The standard measurement ISO 307 method determines viscosity number of a polyamide as a 0.005 g/ml solution in 90 wt.-% of formic acid at 25° C.

Additionally, the composition of the present invention may comprise a mixture of the semi-aromatic, semi-crystalline copolyamide 66/6A as defined above and the polyamide 66 in order to increase the mechanical properties of the polyamide composition. However, according to the teaching of the present invention, the use of polyamide 66 in combination with the copolyamide 66/6A is not mandatory to obtain a polyamide composition showing the desired mechanical and optical properties as discussed above. The mixture of copolyamide 66/6A and polyamide 66 forms a polyamide matrix in the polyamide composition. It is preferred that the polyamide composition of the present invention does not comprise other polyamides than semi-aromatic, semi-crystalline copolyamide 66/6A and polyamide 66 as defined above.

In particular, the composition according to the present invention comprises polyamide 66 in an amount of 0 to 70 wt.-%, preferably in an amount of 5 to 45 wt.-%, 8 to 35 wt.-%, 10 to 30 wt.-%, more preferably in an amount of 15 to 25 wt.-% based on the total weight of the polyamide composition.

In order to exhibit the excellent mechanical properties, the composition of the present invention additionally comprises 25 to 80 wt.-% of flat glass fibers as reinforcing filler.

In the present invention, the term "flat glass fibers" is intended to denote glass fibers having a non-circular cross section. Flat glass fibers suitable for being used as reinforcing filler in the composition of the present invention may have any non-circular cross section such as an elliptical section, oblong-circular section, rectangle section, a section in which half rounds are connected to both short sides of a rectangle, and cocoon section.

The aspect ratio (=major axis/minor axis) of said non-circular cross section of the flat glass fibers is advantageously from 1.0 to 10, preferably from 1.5 to 6.0, more preferably from 2.0 to 5.0, most preferably from 3.0 to 4.0.

The aspect ratio according to the present invention can be determined by analyzing an image obtained by observing a cross section of the flat glass fiber with a scanning electron microscope (SEM), and circumscribing the non-circular section of the flat glass fiber with a rectangle. The aspect ratio is obtained by calculating A (=length of Ra)/B (=length of Rb) wherein A and B are the length of a long side Ra and a short side Rb of a rectangle circumscribed to the flat glass fiber in the observed image.

The nature of glasses constituting the flat glass fibers of the composition of the present invention is not particularly limited and can include E glass, T glass, NE glass, C glass, S glass, S2 glass and R glass, and the like. Flat fibers may contain sizing agents on their surface in order to guarantee their cohesion when in continuous and chopped strand forms, and particularly to provide adhesion at the interface with the polyamide matrix.

Furthermore, the flat glass fibers of the present invention preferably have a length of the main cross-sectional axis in a range of 6 to 40 μm, in particular of 17 to 30 μm, more preferably of 24 to 28 μm. The length of the subsidiary cross-sectional axis is preferably in the range of 3 to 20 μm, in particle in the range of 4 to 10 μm. It is even more preferred that the length of the main cross-sectional axis is 7 or 8 μm.

The polyamide composition of the present invention can be produced by any known method for the production of long fiber-reinforced rod granulate, in particular by pultrusion processes in which the endless fiber strand (roving) is completely saturated with the polymer melt and subsequently is cooled and cut.

The long fiber-reinforced rod shaped granulate obtained in this way, which has preferably a granulate length of 3 to 30 mm, in particular of 7 to 28 mm or more preferably of 4 to 12 mm, can be further processed with normal processing methods (such as e.g. extrusion, injection and/or blow molding) to form molded parts, particular good properties of the molded part being achieved with gentle processing methods. Preferably the molded parts are produced by injection molding. In this context, gentle means above all that excessive fiber breakage and the great reduction in fiber length associated therewith is extensively avoided. In injection molding, this means that screws with large diameter should be used.

According to the teaching of the present invention, the polyamide composition comprises the flat glass fibers in an amount of 25 to 80 wt.-%, preferably in an amount of 30 to 70 wt.-%, more preferably in an amount of 40 to 60 wt.-% based on the total weight of the composition.

It has been found out that the polyamide composition of the present invention should comprise not more than 80 wt.-%, preferably not more than 70 wt.-% of flat glass fibers, based on the total weight of the composition, in order to ensure that the polyamide composition is extrudable.

Moreover, the polyamide composition of the present invention includes at least one additive in an amount of 0 to 70 wt.-% based on the total weight of the composition.

The term "additive" as used herein refers to every compound suitable for the polyamide composition according to the invention, but does not refer to polyamide resins. In particular the additives which may be advantageously used in the composition, include a colorant, a lubricant, a light and/or heat stabilizer, an impact modifier, a flame retardant, a plasticizer, a nucleating agent, a catalyst, an antioxidant, an antistatic agent, a pigment, and any combinations thereof.

It is preferred that the amount of at least one additive present in the polyamide composition of the present invention is from 0.1 to 5.0 wt.-%, preferably from 0.2 to 3.5 wt.-%, 0.5 to 2.5 wt.-%, more preferably 0.8 to 1.5 wt.-% based on the to the total weight of the composition.

The polyamide composition of the present invention may be used to produce molded parts preferably by injection molding. According to the present invention, these molded parts are preferably used to produce mechanical parts which requires high stiffness and mechanical resistance, in particular creep resistance and high fatigue strength. The mechanical parts are for example, interior and exterior parts for an automobile, for examples structural part or housing parts, engine mount, brake pedal, steering lock body housing, chassis, transmission support and bearing case for an automobile, housing parts for appliances and equipment for telecommunications, housing parts for entertainment electronics or housing parts of electrical apparatuses.

Other details or advantages of the present invention will become more clearly apparent through the examples given below. The present invention will be elucidated by the following examples, which are intended to demonstrate, but not to restrict, the invention.

EXAMPLES

Test Methods

The properties of the compositions according to the inventive and comparative examples were determined by using the following measurement methods:
- Tensile Strength according to ISO 527 type 1A;
- Tensile Modulus according to ISO 527 type 1A;
- Elongation at break according to ISO 527 type 1A;
- Flexural Strength according to ISO 178 wherein the test sample has a length of 80 mm, a width of 10 mm and a thickness of 4 mm;
- HDT according to ISO 75/Af;
- Charpy notched impact and Charapy unnotched impact strength according to ISO 179/1 eA wherein the test sample has a length of 80 mm, a width of 10 mm and a thickness of 4 mm;
- Gloss according to ISO 2813, the determination of specular gloss was carried out on non-metallic paint films at 20°, 60° and 85° angles;
- Spiral flow length of the test samples has been determined by using an electric injection molding machine (Model: LGE 8011) The injection temperature was 270° C. and the molded temperature was 80° C. to produce a sample having a width of 5 mm and a thickness of 3 mm.

Ingredients
- Polyamide 66/6T: STABAMID® 26UE1 available from Solvay Polyamide & Intermediates having a melting point of 282° C., viscosity number of 80 ml/g and a PA66/6A ratio of 65:35;
- Polyamide 6T/66: AMODEL® A-6000 produced by Solvay Speciality Polymers having a melting point of 310° C. and a PA66/6A ratio of 45:55;
- Polyamide 66: STABAMID® 26AE1 available from Solvay Polyamide & Intermediates;
- Polyamide A-1007 (PPA, PA6T/6I) available from Solvay Specialty Polymers having a melting point of 313° C.;
- Standard Glass Fibers (10 microns): ECSO® 3T-289 H glass fibers from Nippon Electric Glass Co., Ltd.;
- Flat Glass Fibers: ESC301-HF having an aspect ratio of 4:1 available from Chongqing Polycomp International Corp.

Each composition of inventive Examples 1-15 and of comparative Examples 2-13 includes 1.51 wt.-%, based on the total weight of the composition, of a mixture of additives including heat stabilizers, dyes and lubricants.

The composition of Comparative Example 1 corresponds to the composition of Example 3 of WO 2015/193144 and includes 2.52 wt.-%, based on the total weight of the composition, of a mixture of additives including heat stabilizers, dyes and lubricants.

The polyamide compositions according to the comparative and inventive examples were obtained by i) feeding all the components except the glass fiber through a main feeder, while the glass fiber was fed into a side feeder, and ii) subsequently extruding the mixture. The extrusion temperatures were 280-260-260-290-290-290-280-280-280-220 from the nozzle to hopper, and throughput and RPM were 80 kg/hr and 450 RPM. The extrudates where then cooled in water at room temperature.

All mechanical properties of the compositions, as indicated in the tables below, were measured before (indicated as DAM) and also after (indicated as "conditioned") the samples were exposed to moisture under 70° C. and a humidity of 62% over 14 days, based on the standard method ISO 1110 (Plastics-Polyamides-Accelerated conditioning of test specimens), whereas HDT was only measured before the compositions were conditioned.

TABLE 1

| Compounds | Example 1 | Example 2 | Example 3 | Example 4 | Example 5 | Example 6 | Comparative Example 1 |
|---|---|---|---|---|---|---|---|
| PA66/6T (wt.-%) | 68.49 | 62.49 | 34.245 | 48.49 | 38.49 | 28.49 | 74.48 |
| PA66 (wt.-%) | | 6 | 34.245 | | | | 6 |
| PPA, PA6T/6I (wt.-%) | | | | | | | |
| Flat glass fibers (wt.-%) | 30 | 30 | 30 | 50 | 60 | 70 | |
| Normal gals fibers (wt.-%) | | | | | | | 17 |
| Properties before exposed to moisture (DAM) | | | | | | | |
| Tensile Strength (MPA) | 177 | 176 | 178 | 245 | 251 | 255 | 103 |
| Tensile Modulus (MPa) | 9723 | 10022 | 9754 | 17114 | 21566 | 26500 | 6767 |
| Elongation at break (%) | 2.4 | 2.5 | 2.5 | 2.4 | 2.1 | 1.6 | 1.7 |
| Flexural Strength (MPa) | 256 | 250 | 259 | 340 | 369 | 380 | 156 |
| Flexural Modulus (MPa) | 7564 | 7494 | 7437 | 13500 | 15900 | 19500 | 4743 |
| HDT(18.5) (° C.) | 250 | 252 | 242 | 257 | 261 | 261 | 220 |
| Charpy notched Impact Strength(kJ/m$^2$) | 14.7 | 14.7 | 15.1 | 19.0 | 19.8 | 21.0 | 7.2 |
| Charpy unnotched Impact Strength (kJ/m$^2$) | 56.3 | 58.0 | 63.5 | 92.1 | 77.8 | 47.9 | 24.1 |
| Density (g/cm$^3$) | 1.386 | 1.3829 | 1.3705 | 1.5914 | 1.7203 | 1.868 | 1.2777 |
| Gloss(60°) | 97.6 | 96.4 | 92.6 | 86.8 | 76.7 | 72.7 | 98.2 |
| Spiral flow length (cm) | 62.0 | 60.0 | 59.5 | 46.5 | 41.5 | 30.0 | 60.0 |
| Properties after exposed to moisture (conditioned) | | | | | | | |
| Tensile Strength (MPa) | 153 | 151 | 139 | 207 | 210 | 220 | 85 |
| Tensile Modulus (MPa) | 9467 | 9422 | 8370 | 16177 | 20880 | 24932 | 6277 |
| Elongation at break (%) | 2.8 | 2.9 | 4.5 | 2.7 | 2.5 | 1.8 | 1.9 |
| Flexural Strengt (MPa) | 223 | 219 | 198 | 295 | 312 | 330 | 133 |
| Flexural Modulus (MPa) | 6709 | 6387 | 5635 | 11800 | 14880 | 17460 | 3882 |
| Charpy notched Impact Strength (kJ/m$^2$) | 14.4 | 13.5 | 15.2 | 20.8 | 20.9 | 20.5 | 4.3 |
| Charpy unnotched Impact Strength(kJ/m$^2$) | 53.0 | 52.2 | 66.2 | 82.4 | 69.9 | 51.0 | 21.3 |
| Water absorption (%) | 1.31 | 1.34 | 1.53 | 0.86 | 0.64 | 0.45 | 1.62 |

TABLE 2

| Compounds | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|
| PA66/6T (wt.-%) | 81.49 | | 81.49 | 68.49 | 48.49 | 38.49 | | |
| PA66 (wt.-%) | | 68.49 | | | | | | |
| PPA, PA6T/6I (wt.-%) | | | | | | | 48.49 | 38.49 |
| Flat glass fibers (wt.-%) | 17 | 30 | | | | | 50 | 60 |
| Normal glass fibers (wt.-%) | | | 17 | 30 | 50 | 60 | | |
| Properties before exposed to moisture (DAM) | | | | | | | | |
| Tensile Strength (MPa) | 109 | 188 | 105 | 170 | 240 | 245 | 249 | 240 |
| Tensile Modulus (MPa) | 6667 | 9772 | 6500 | 9300 | 16500 | 21000 | 18027 | 22640 |
| Elongation at break (%) | 1.9 | 2.9 | 2.1 | 2.7 | 2.8 | 2.0 | 1.9 | 1.3 |
| Flexural Strength (MPa) | 165 | 271 | 160 | 250 | 320 | 355 | 303 | 320 |
| Flexural Modulus (MPa) | 5470 | 7585 | 4754 | 7370 | 12850 | 15000 | 11380 | 14250 |
| HDT(18.5) (° C.) | 234 | 241 | 215 | 245 | 252 | 255 | 213 | 245 |
| Charpy notched Impact Strength(kJ/m$^2$) | 8.8 | 14.9 | 7.3 | 11.6 | 16.0 | 17.5 | 19.0 | 20.9 |
| Charpy unnotched Impact Strength(kJ/m$^2$) | 26.3 | 72.3 | 35.6 | 66.0 | 95.2 | 65.1 | 41.2 | 32.9 |
| Density (g/cm$^3$) | 1.2794 | 1.3608 | 1.2763 | 1.3866 | 1.595 | 1.7271 | 1.6604 | 1.7509 |
| Gloss (60°) | 98.5 | 87.8 | 96.2 | 88.8 | 65.5 | 64.7 | 52.5 | 39.1 |
| Spiral flow length (cm) | 69.0 | 57.0 | 65.0 | 53.5 | 34.0 | 29.5 | 40.0 | 39.0 |
| Properties after exposed to moisture (conditioned) | | | | | | | | |
| Tensile Strength (MPa) | 101 | 133 | 92 | 135 | 190 | 200 | 243 | 251 |
| Tensile Modulus (MPa) | 6300 | 7812 | 6094 | 9050 | 15200 | 19500 | 17800 | 21800 |
| Elongation at break (%) | 2.3 | 5.6 | 3.7 | 4.4 | 3.9 | 2.8 | 1.9 | 1.6 |
| Flexural Strength (MPa) | 161 | 193 | 154 | 212 | 280 | 289 | 286 | 288 |
| Flexural Modulus (MPa) | 4369 | 5376 | 4147 | 6590 | 11500 | 13660 | 11090 | 13680 |
| Charpy notched Impact Strength (kJ/m$^2$) | 8.2 | 19 | 6.8 | 10.2 | 18.2 | 16.6 | 18.4 | 18.2 |
| Charpy unnotched (kJ/m$^2$) Impact Strength | 29.8 | 84.2 | 34.8 | 63.6 | 86.8 | 63.5 | 26.7 | 33 |
| Water absorption (%) | 1.63 | 1.73 | 1.71 | 1.43 | 0.98 | 0.78 | 0.75 | 0.57 |

Figure 1:
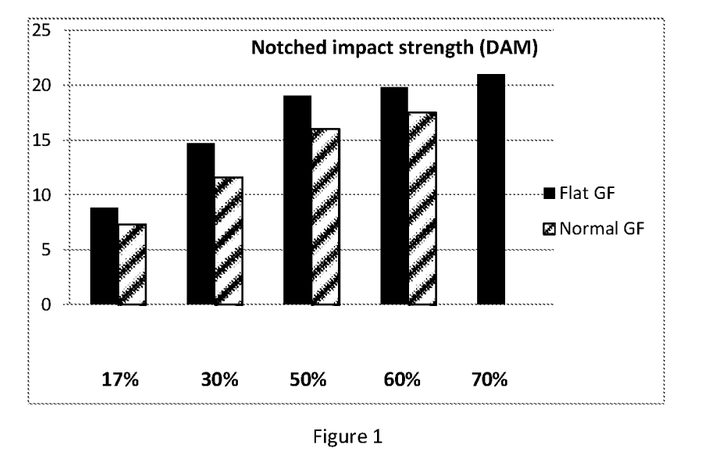
FIGS. 1 and 2 refer to notched impact strengths of polyamide compositions dependent on the content of flat glass fibers (Flat GF) or standard (normal) glass fibers (Normal GF) present in the polyamide compositions before (DAM) or after (conditioned) these compositions were exposed to moisture.
Figure 2:
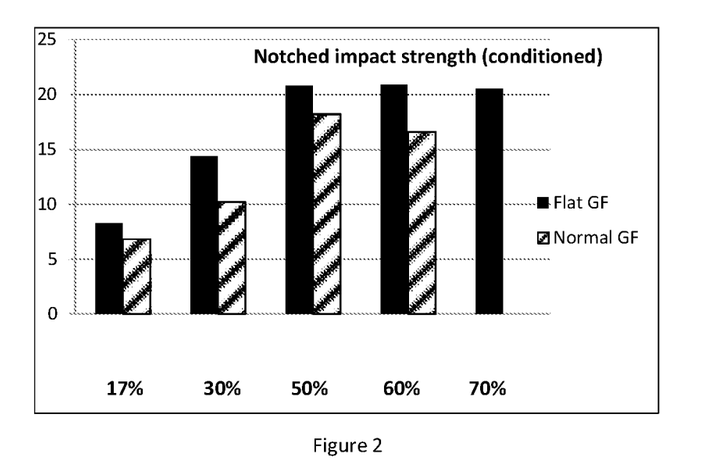

A comparison between the properties of the composition according to inventive Examples 1-6 and Comparative Examples 4-7 of Tables 1 and 2 shows that the notched impact strength of the polyamide composition can be increased in case the composition includes flat glass fibers instead of normal fibers. This effect is in particular obtained after the compositions are exposed to moisture (conditioned) (see FIGS. 1 and 2).

Figure 3:
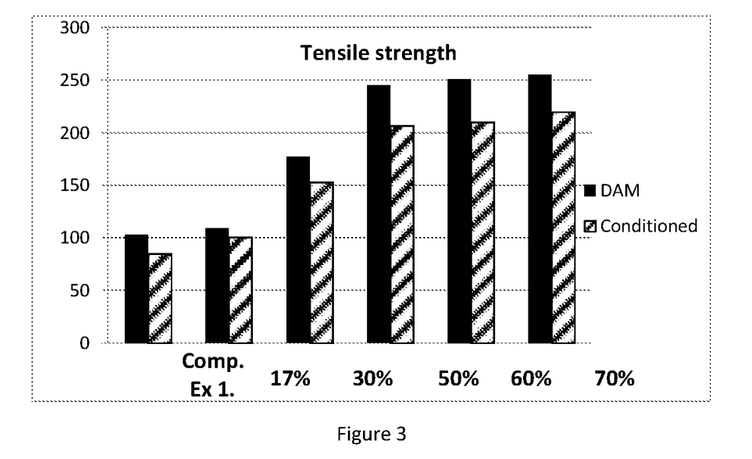
FIGS. 3 to 5 show the influence of the content of flat glass fibers (Flat GF) present in the polyamide compositions on tensile strength, notched impact strength, and flexural modulus of polyamide compositions before (DAM) or after (conditioned) the compositions were exposed to moisture.
Figure 4:
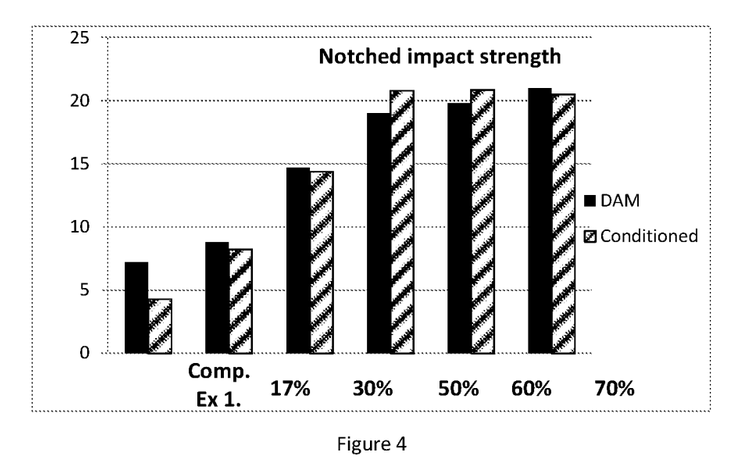
Figure 5:
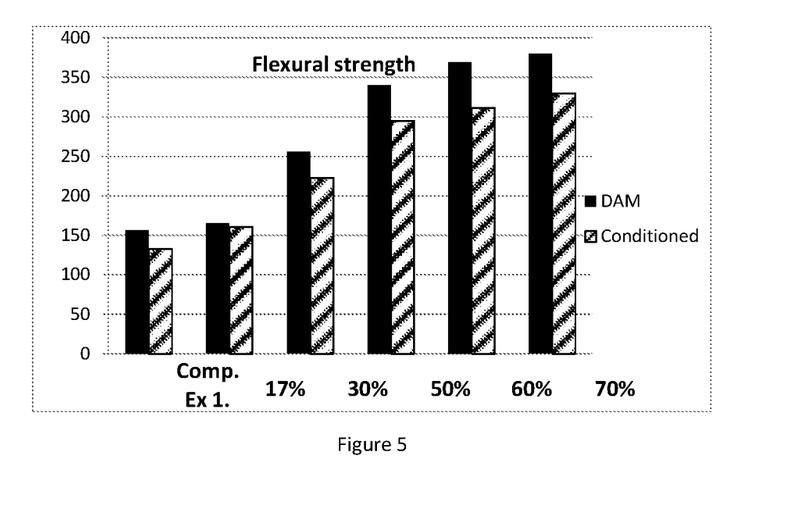

Furthermore, the examples demonstrate that the tendency of the compositions according to the present invention to absorb moisture is much lower than of compositions which are not in accordance with the present invention. This property of the inventive compositions results in improved mechanical properties, for example tensile strength, notched impact strength and flexural strength (see FIGS. 3-5), but also to improved optical properties, for example gloss.

TABLE 3

| Compounds | Comparative Example 10 | Example 7 | Example 8 | Example 9 | Example 10 | Example 11 |
|---|---|---|---|---|---|---|
| PA66 (wt.-%) | 48.49 | 43.49 | 38.49 | 33.49 | 28.49 | 23.49 |
| PA66/6T (wt.-%) | | 5.00 | 10.00 | 15.00 | 20.00 | 25.00 |

TABLE 3-continued

| | | | | | | | | | | | | |
|---|---|---|---|---|---|---|---|---|---|---|---|---|
| Flat glass fibers (wt.-%) | 50.00 | | 50.00 | | 50.00 | | 50.00 | | 50.00 | | 50.00 | |

| Pro-perties | Comparative Example 10 | | Example 7 | | Example 8 | | Example 9 | | Example 10 | | Example 11 | |
|---|---|---|---|---|---|---|---|---|---|---|---|---|
| | DAM | Cond. | DAM | Cond. | DAM | Cond. | DAM | Cond. | DAM | Cond. | DAM | Cond. |
| Tensile Strength (MPa) | 187 | 132 | 184 | 131 | 180 | 130 | 178 | 128 | 176 | 128 | 176 | 132 |
| Tensile Modulus (MPA) | 15634 | 11259 | 14959 | 11018 | 14869 | 11730 | 14700 | 11265 | 15604 | 12391 | 14580 | 13185 |
| Elongation at break (%) | 2.2 | 3.8 | 2.2 | 3.6 | 2.1 | 3.7 | 2.2 | 3.8 | 2.1 | 3.5 | 2.1 | 3.2 |
| Flexural Strength (MPa) | 277 | 205 | 278 | 208 | 274 | 205 | 272 | 203 | 270 | 205 | 271 | 208 |
| Flexural Modulus (MPa) | 11410 | 4935 | 11670 | 8148 | 11410 | 7971 | 11290 | 8108 | 11260 | 8363 | 11210 | 8369 |
| HDT (18.5) (° C.) | 243 | | 243 | | 244 | | 239 | | 240 | | 243 | |
| Charpy notched impact strength (kJ/m$^2$) | 11.5 | 15.8 | 10.8 | 15.2 | 10.8 | 15.3 | 10.2 | 13.6 | 10.5 | 13.3 | 10.6 | 12.9 |
| Charpy unnotch impact strength (kJ/m$^2$) | 68.7 | 70.0 | 64.3 | 69.5 | 62.8 | 67.9 | 63.8 | 63.2 | 64.9 | 63.5 | 63 | 65.9 |
| Density (g/cm$^3$) | 1.5643 | | 1.5706 | | 1.5744 | | 1.5761 | | 1.5779 | | 1.579 | |
| Gloss (60°) | 87.8 | | 90.9 | | 92.0 | | 92.0 | | 92.7 | | 93.1 | |

TABLE 3a

| Compounds | Example 12 | | Example 13 | | Example 14 | | Example 15 | |
|---|---|---|---|---|---|---|---|---|
| PA66 (wt.-%) | 18.49 | | 13.49 | | 8.49 | | | |
| PA66/6T (wt.-%) | 30.00 | | 35.00 | | 40.00 | | 48.49 | |
| Flat glass fibers (wt.-%) | 50.00 | | 50.00 | | 50.00 | | 50.00 | |

| Properties | Example 12 | | Example 13 | | Example 14 | | Example 15 | |
|---|---|---|---|---|---|---|---|---|
| | DAM | Cond. | DAM | Cond. | DAM | Cond. | DAM | Cond. |
| Tensile Strength (MPa) | 190 | 146 | 184 | 144 | 199 | 165 | 208 | 171 |
| Tensile Modulus (MPA) | 15211 | 13902 | 14921 | 13519 | 15227 | 13923 | 15430 | 14711 |
| Elongation at break (%) | 2.1 | 3.2 | 2.2 | 3 | 2.2 | 2.7 | 2.3 | 2.5 |
| Flexural Strength (MPa) | 287 | 227 | 281 | 225 | 304 | 247 | 304 | 256 |
| Flexural Modulus (MPa) | 11580 | 9008 | 11410 | 9258 | 11920 | 9916 | 12130 | 10720 |
| HDT(18.5) (° C.) | 246 | | 247 | | 254 | | 255 | |
| Charpy notched impact strength (kJ/m$^2$) | 12.8 | 15 | 11.1 | 13.9 | 13.7 | 16.4 | 14.1 | 16.5 |
| Charpy unnotch impact strength (kJ/m$^2$) | 67.4 | 69.2 | 66.5 | 66.7 | 75 | 71.6 | 74.9 | 74 |
| Density (g/cm$^3$) | 1.5794 | | 1.5847 | | 1.5836 | | 1.5887 | |
| Gloss (60°) | 93.2 | | 93.2 | | 93.2 | | 93.5 | |

TABLE 4

| Compounds | Example 1 | Example 2 | Example 4 | Comparative Example 11 | Comparative Example 12 | Comparative Example 13 |
|---|---|---|---|---|---|---|
| PA66/6T(65:35) (wt.-%) | 68.49 | 62.49 | 48.49 | | | |
| PA66 (wt.-%) | | 6 | | | 6 | |
| PA6T/66(55:45) AMODEL ® A-6000 (wt.-%) | | | | 68.49 | 62.49 | 48.49 |
| Flat glass fibers (wt.-%) | 30 | 30 | 50 | 30 | 30 | 50 |
| Properties before exposed to moisture (DAM) | | | | | | |
| Tensile Strength (MPa) | 177 | 176 | 245 | 170 | 170 | 240 |
| Tensile Modulus (MPa) | 9723 | 10022 | 17114 | 9659 | 9720 | 17121 |
| Elongation at break (%) | 2.4 | 2.5 | 2.4 | 1.9 | 2.0 | 2.2 |
| Flexural Strength (MPa) | 256 | 250 | 340 | 245 | 250 | 320 |
| Flexural Modulus (MPa) | 7564 | 7494 | 13500 | 7452 | 7486 | 12958 |
| HDT(18.5) (° C.) | 250 | 252 | 257 | 268 | 263 | 285 |
| Charpy notched Impact Strength(kJ/m$^2$) | 14.7 | 14.7 | 19.0 | 11.7 | 12.6 | 18.0 |
| Charpy unnotched Impact Strength (kJ/m$^2$) | 56.3 | 58 | 92.1 | 43.4 | 47.9 | 82.5 |
| Density (g/cm$^3$) | 1.386 | 1.3829 | 1.5914 | 1.402 | 1.399 | 1.608 |
| Gloss (60°) | 97.6 | 96.4 | 86.8 | 71.2 | 68.6 | 60.8 |
| Spiral flow length (cm) | 62 | 60 | 46.5 | 47 | 48 | 35 |

Figure 6:
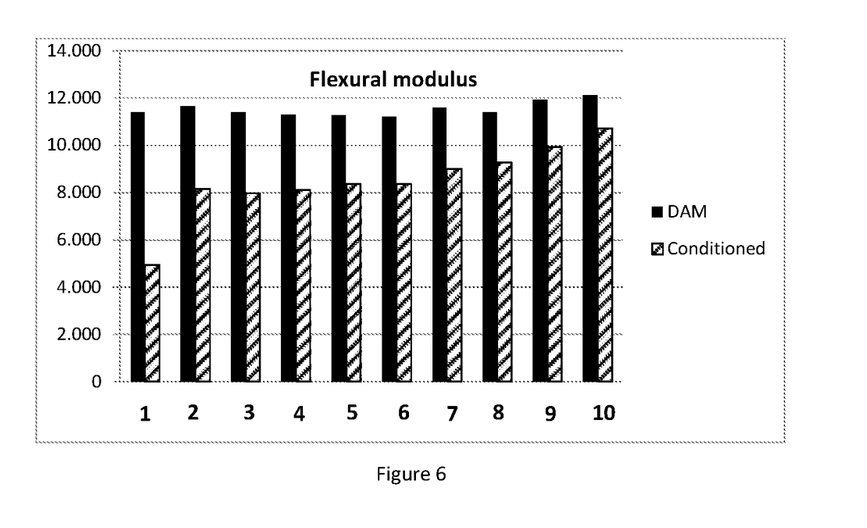
FIG. 6 shows the flexural moduli of the compositions of Examples 7-15 (bars 2 to 10 of the diagram) in comparison to Comparative Example 10 (bar 1 of the diagram) before (DAM) and after (conditioned) the compositions were exposed to moisture (see Tables 3 and 3a).
Figure 7:
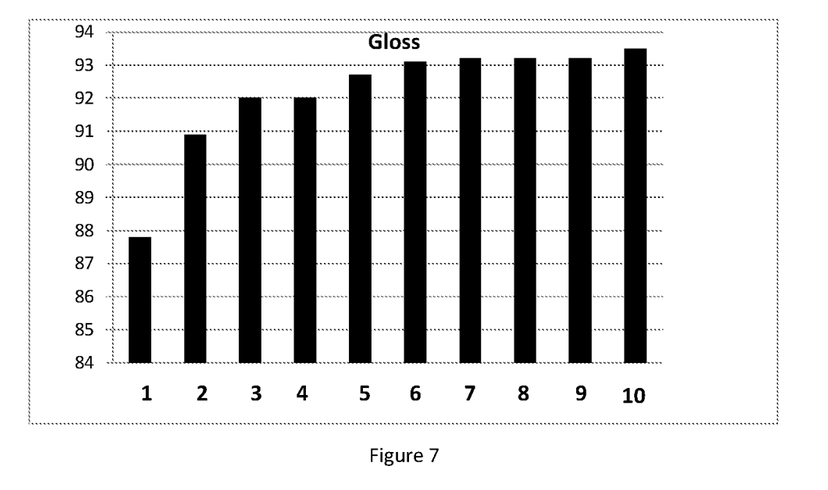
FIG. 7 shows the gloss values of the compositions of Examples 7-15 (bars 2 to 10 of the diagram) in comparison to Comparative Example 10 (bar 1 of the diagram) (see Tables 3 and 3a).

Comparative Examples 8 and 9 (see Table 2), but in particular Comparative Example 10 and inventive Examples 7-15 (see Tables 3 and 3a) show that in addition to a sufficient amount of flat glass fibers it is essential that the composition comprises at least 5 wt.-% of the copolyamide PA66/6A as defined in the present invention in order to provide a composition having improved gloss and mechanical properties in particular after the polyamide composition is exposed to moisture (conditioned) (see FIGS. 6 and 7).

Inventive Examples 1, 2 and 4 show improved gloss and spiral length as compared to Comparative Examples 11-13 based on PA66/6A having a molar ratio of polyamide 66 to polyamide 6A of 45:55.

The invention claimed is:

1. A composition consisting of
   a) 5 to 75 wt.-% of a semi-aromatic, semi-crystalline copolyamide 66/6A, with A being a monomeric unit derived from an aromatic dicarboxylic acid, having a molar ratio of polyamide 66 to polyamide 6A being in a range of 70:30 to 55:45;
   b) 0 to 70 wt.-% of polyamide 66;
   c) 25 to 80 wt.-% of flat glass fibers; and
   d) optionally at least one further additive in an amount of 0 to 70 wt.-%, wherein the total weight of a) to d) is 100 wt.-% of the composition.

2. The composition according to claim 1, wherein the semi-aromatic, semi-crystalline copolyamide 66/6A has a melting point of 300° C. or lower.

3. The composition according to claim 1, wherein the semi-aromatic, semi-crystalline copolyamide 66/6A has a viscosity number of 60 to 140 ml/g.

4. The composition according to claim 1, wherein the semi-aromatic, semi-crystalline copolyamide 66/6A is a copolyamide of PA66/6T or PA66/6I.

5. The composition according to claim 1, wherein the semi-aromatic, semi-crystalline copolyamide 66/6A is present in an amount of 5 to 70 wt.-% in the composition.

6. The composition according to claim 1, wherein the polyamide 66 is present in an amount of 5 to 45 wt.-% in the composition.

7. The composition according to claim 1, wherein the flat glass fibers are present in an amount of 30 to 70 wt.-% in the composition.

8. The composition according to claim 1, wherein the aspect ratio of the flat glass fibers is from 1.5 to 10.

9. The composition according to claim 1, wherein the at least one further additive is selected from the group consisting of a colorant, a lubricant, a light and/or heat stabilizer, an impact modifier, a flame retardant, a plasticizer, a nucleating agent, a catalyst, an antioxidant, an antistatic agent, and a pigment.

10. Molded parts obtainable by injection molding of the composition according to claim 1.

11. Mechanical parts comprising the molded parts according to claim 10.

12. Mechanical parts according to claim 11, wherein the mechanical parts are selected from the group consisting of interior and exterior parts for automobile, housing parts of electrical apparatuses, housing parts for appliances and equipment for telecommunications and housing parts for entertainment electronics.

13. Mechanical parts according to claim 12, wherein the interior and/or exterior parts for automobile are selected from the group consisting of structural part or housing parts, engine mount, brake pedal, steering lock body housing, chassis, transmission support and bearing case.

* * * * *